United States Patent
Keating et al.

(10) Patent No.: US 9,322,364 B2
(45) Date of Patent: Apr. 26, 2016

(54) ENGINE INLET FOR EGR-AIR FLOW DISTRIBUTION

(71) Applicant: GM Global Technology Operations LLC, Detroit, MI (US)

(72) Inventors: Edward J. Keating, Ortonville, MI (US); Alan W. Hayman, Romeo, MI (US); Robert S. McAlpine, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 270 days.

(21) Appl. No.: 13/947,786

(22) Filed: Jul. 22, 2013

(65) Prior Publication Data

US 2015/0020781 A1    Jan. 22, 2015

(51) Int. Cl.
F02M 25/07    (2006.01)
F02M 35/10    (2006.01)
F02M 35/112    (2006.01)

(52) U.S. Cl.
CPC ..... *F02M 25/0722* (2013.01); *F02M 35/10111* (2013.01); *F02M 35/10222* (2013.01); *F02M 35/10262* (2013.01); *F02M 35/112* (2013.01)

(58) Field of Classification Search
CPC .............. F02D 41/0002; F02D 41/006; F02D 41/0065; F02M 25/0707; F02M 25/07; F02M 25/0749; F02M 25/0752; F02M 35/10045; F02M 35/10052; F02M 35/10072
USPC ............... 123/568.11, 568.12, 568.17, 184.2, 123/184.22
See application file for complete search history.

(56) References Cited

U.S. PATENT DOCUMENTS

| | | | | |
|---|---|---|---|---|
| 3,930,473 A | * | 1/1976 | McFarland, Jr. | F02B 29/02 123/184.34 |
| 3,981,276 A | * | 9/1976 | Ernest | F02B 53/06 123/242 |
| 5,490,488 A | * | 2/1996 | Aversa | F02B 75/22 123/184.31 |
| 5,492,093 A | * | 2/1996 | Rygiel | F02M 25/0722 123/306 |
| 6,155,223 A | * | 12/2000 | Miazgowicz | F02B 47/08 123/184.35 |
| 6,237,547 B1 | * | 5/2001 | Ishiyama | F02M 25/0703 123/41.31 |
| 6,748,921 B1 | * | 6/2004 | Surges | F02B 31/04 123/306 |
| 7,036,493 B1 | | 5/2006 | Huebler et al. | |
| 7,140,357 B2 | * | 11/2006 | Wei | F02B 29/0425 123/568.17 |
| 7,908,859 B2 | | 3/2011 | Carlsson et al. | |
| 8,443,603 B2 | | 5/2013 | Hayman et al. | |
| 2006/0075997 A1 | * | 4/2006 | Huebler | F02M 25/0722 123/568.17 |
| 2010/0077996 A1 | * | 4/2010 | Pantow | F02M 25/0707 123/557 |
| 2011/0041817 A1 | * | 2/2011 | Guerry | F02M 25/0722 123/568.17 |
| 2012/0085163 A1 | * | 4/2012 | Yamaguchi | G01F 1/00 73/204.25 |
| 2012/0325186 A1 | * | 12/2012 | Enami | F02M 35/10222 123/568.17 |

* cited by examiner

*Primary Examiner* — Lindsay Low
*Assistant Examiner* — Long T Tran
(74) *Attorney, Agent, or Firm* — Harness, Dickey & Pierce, P.L.C.

(57) ABSTRACT

An intake manifold having an EGR-air flow distributor for distributing the desired air flow and EGR-air mixture through the intake manifold to each cylinder is disclosed. The EGR-air flow distributor includes a set of guide vanes defining plural flow channels in a plenum region of the inlet manifold. The EGR-air flow distributor also includes an EGR tube partially extending into the inlet manifold and having a slot formed therein for introducing EGR into the plenum region at a single location between the engine throttle and the guide vanes.

18 Claims, 4 Drawing Sheets

US 9,322,364 B2

ENGINE INLET FOR EGR-AIR FLOW DISTRIBUTION

FIELD

The present disclosure relates to exhaust gas recirculation or EGR for a multi-cylinder internal combustion engine, and more particularly to an inlet manifold having an EGR feed tube and an inlet guide vane configuration for achieving the desired EGR-air flow distribution.

BACKGROUND

This section provides background information related to the present disclosure which is not necessarily prior art.

A typical automotive engine is a four-cycle internal combustion device which includes an engine block having multiple cylinders. Each cylinder supports a piston for reciprocating movement. A cylinder head is coupled to a top surface of the engine block such that the block, head and piston top define a combustion chamber. The cylinder head includes a set of intake ports and a set of exhaust ports for each cylinder which, in combination with the intake valves and exhaust valves, allow combustion gases to enter the combustion chambers and exhaust gases to exit from the combustion chamber. An intake manifold and an exhaust manifold are typically coupled to the cylinder head for routing the combustion and exhaust gases to and from the intake and exhaust ports.

It is common for a portion of the exhaust gases exiting the combustion chamber to be recirculated through an exhaust gas recirculation or EGR circuit to the intake manifold. While EGR is effective for decreasing undesirable engine emissions under certain driving conditions, it can negatively impact the engine performance including fuel efficiency and power output. These effects can be minimized when the EGR is adequately mixed with intake air and the EGR/air mixture is proportionally distributed to each cylinder of the internal combustion engine. Accordingly, there is a need for an improved EGR-air flow distribution system which can be readily incorporated into existing engine architecture in a cost effective manner.

SUMMARY

This section provides a general summary of the disclosure, and is not a comprehensive disclosure of its full scope or all of its features.

An air intake system for an internal combustion engine is provided. The air intake system includes an intake manifold having an air inlet for admitting combustion gases into a plenum of the intake manifold. The manifold also has a plurality of runners, each runner extending from the plenum and terminating at an outlet through which combustion gases flow from the manifold to respective cylinders. The intake manifold has an EGR inlet for admitting exhaust gas which has been recirculated through an EGR valve from the exhaust side of the engine. An EGR tube is located in the air intake system and partially extends into the plenum adjacent the air inlet. The EGR tube has a slot formed therein which faces away from the air inlet and into the plenum. A set of guide vanes are arranged in the plenum with an upstream end near the EGR tube. These guide vanes curve and diverge from the EGR tube toward the runners to form flow channels in the plenum. Each vane has a vane gap allowing a degree of fluid communication across and between flow channels.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
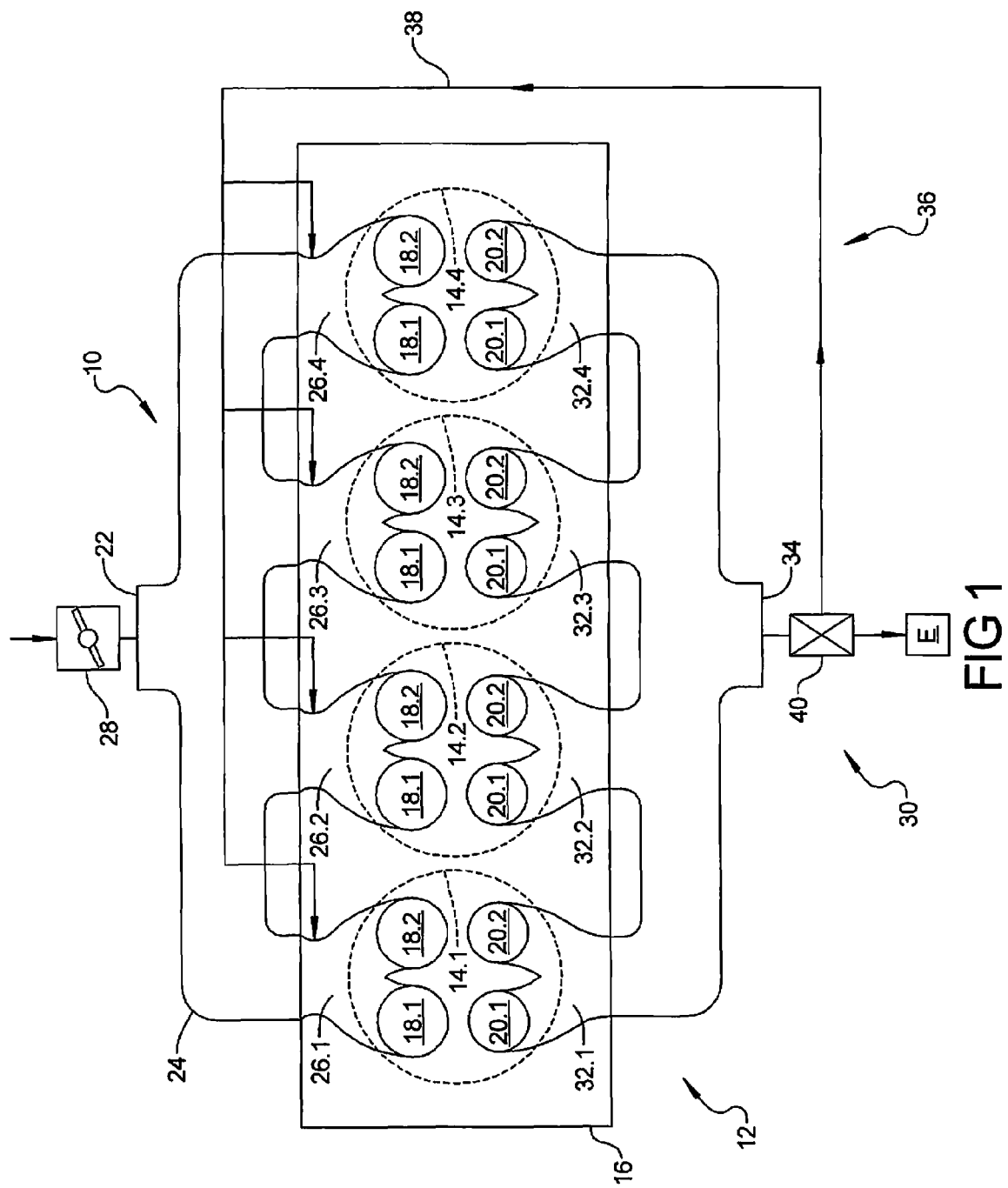
FIG. 1 is a schematic representation of a four-cylinder internal combustion engine with EGR.

Example embodiments will now be described more fully with reference to the accompanying drawings, wherein like numerals indicate like parts throughout the several views.

Example embodiments are provided so that this disclosure will be thorough, and will fully convey the scope of this disclosure to those who are skilled in the art. Specific details may be set forth to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known structures, and well-known technologies are not described in detail.

The terminology used herein is for the purpose of describing particular example embodiments only and is not intended to be limiting. As used herein, the singular forms "a," "an," and "the" may include the plural forms as well, unless the context clearly indicates otherwise. The terms "comprises," "comprising," "including," and "having," are inclusive and therefore specify the presence of recited structure(s) or step(s); for example, the stated features, integers, steps, operations, groups elements, and/or components, but do not preclude the presence or addition of additional structure(s) or step(s) thereof. The methods, steps, processes, and operations described herein are not to be construed as necessarily requiring performance in the stated or any particular order discussed or illustrated, unless specifically identified as an order of performance. It is also to be understood that additional, alternative or equivalent steps may be employed.

When structure is referred to as being "on," "engaged to," "connected to," or "coupled to" other structure, it may be directly or indirectly (i.e., via intervening structure) on, engaged, connected or coupled to the other structure. In contrast, when structure is referred to as being "directly on," "directly engaged to," "directly connected to," or "directly coupled to" the other structure, there may be no intervening structure present. Other words used to describe the relationship between elements should be interpreted in a like fashion (e.g., "between" versus "directly between," "adjacent" versus "directly adjacent"). As used herein, the term "and/or" includes any and all combinations of one or more of the associated referenced items.

Terms of degree (e.g., first, second, third) which are used herein to describe various structure or steps are not intended to be limiting. These terms are used to distinguish one structure or step from other structure or steps, and do not imply a sequence or order unless clearly indicated by the context of their usage. Thus, a first structure or step similarly may be termed a second structure or step without departing from the teachings of the example embodiments. Likewise, spatially relative terms (e.g., "inner," "outer," "beneath," "below," "lower," "above," "upper") which are used herein to describe the relative special relationship of one structure or step to other structure or step(s) may encompass orientations of the device or its operation that are different than depicted in the figures. For example, if a figure is turned over, structure described as "below" or "beneath" other structure would then be oriented "above" the other structure without materially affecting its special relationship or operation. The structure may be otherwise oriented (e.g. rotated 90 degrees or at other orientations) and the spatially relative descriptors used herein interpreted accordingly.

With reference to FIG. 1, an intake manifold 10 and portion of a multiple-cylinder internal combustion engine 12 are schematically represented. Engine 12 includes an engine block having a plurality of cylinders 14 formed therein, and a cylinder head 16 coupled to the top of the engine block over the cylinders 14. The cylinder head 16 is secured to the engine block and has a set of intake ports 18 and a set of exhaust ports 20 in fluid communication with the cylinders 14. The embodiment illustrated in FIG. 1 includes four cylinders 14.1, 14.2, 14.3, 14.4 (collectively 14) having two intake ports 18.1, 18.2 (collectively 18) and two exhaust ports 20.1, 20.2 (collectively 20) associated with each cylinder 14

The intake manifold 10 is secured to an intake side of the cylinder head 16 for supplying combustion gases (in the form of air or an air/fuel mixture and other gases or diluents that may become part of the combustion process) through the intake ports 18 to the cylinders 14. The intake manifold 10 has an air inlet 22 for admitting the combustion gases into a plenum region 24 and a plurality of inlet runners 26 extending from the plenum region 24. Each inlet runner 26.1-26.4 terminates at the intake port 18.1-18.4 of an associated cylinder 14.1-14.4. A set of intake valves (not shown) are supported on the cylinder head 16 and operate to selectively open and close the intake ports 18. A throttle valve 28 is in fluid communication with the air inlet 22 and controls the amount of combustion gases entering the intake manifold 10.

An exhaust manifold 30 is secured to an exhaust side of the cylinder head 16 for discharging exhaust gases (in the form of combustion bi-products) from the cylinders 14 through the exhaust ports 20 and the exhaust manifold 30 to the exhaust system E. The exhaust manifold 30 has a plurality of exhaust runners 32 in fluid communication with the exhaust ports 20 and extending to an exhaust outlet 34 which is coupled to the exhaust system E. A set of exhaust valves (not shown) are supported on the cylinder head 16 and operate to selectively open and close the exhaust ports 20. Engine 12 includes an exhaust gas recirculation or EGR circuit 36 having a return line 38 from the exhaust side of the engine 12 to the intake manifold 10 for enabling exhaust gas recirculation. An EGR valve 40 disposed in the return line 38 selectively opens and closes for controlling the timing and amount of exhaust gas being recirculated to the intake manifold 10.

Figure 2:
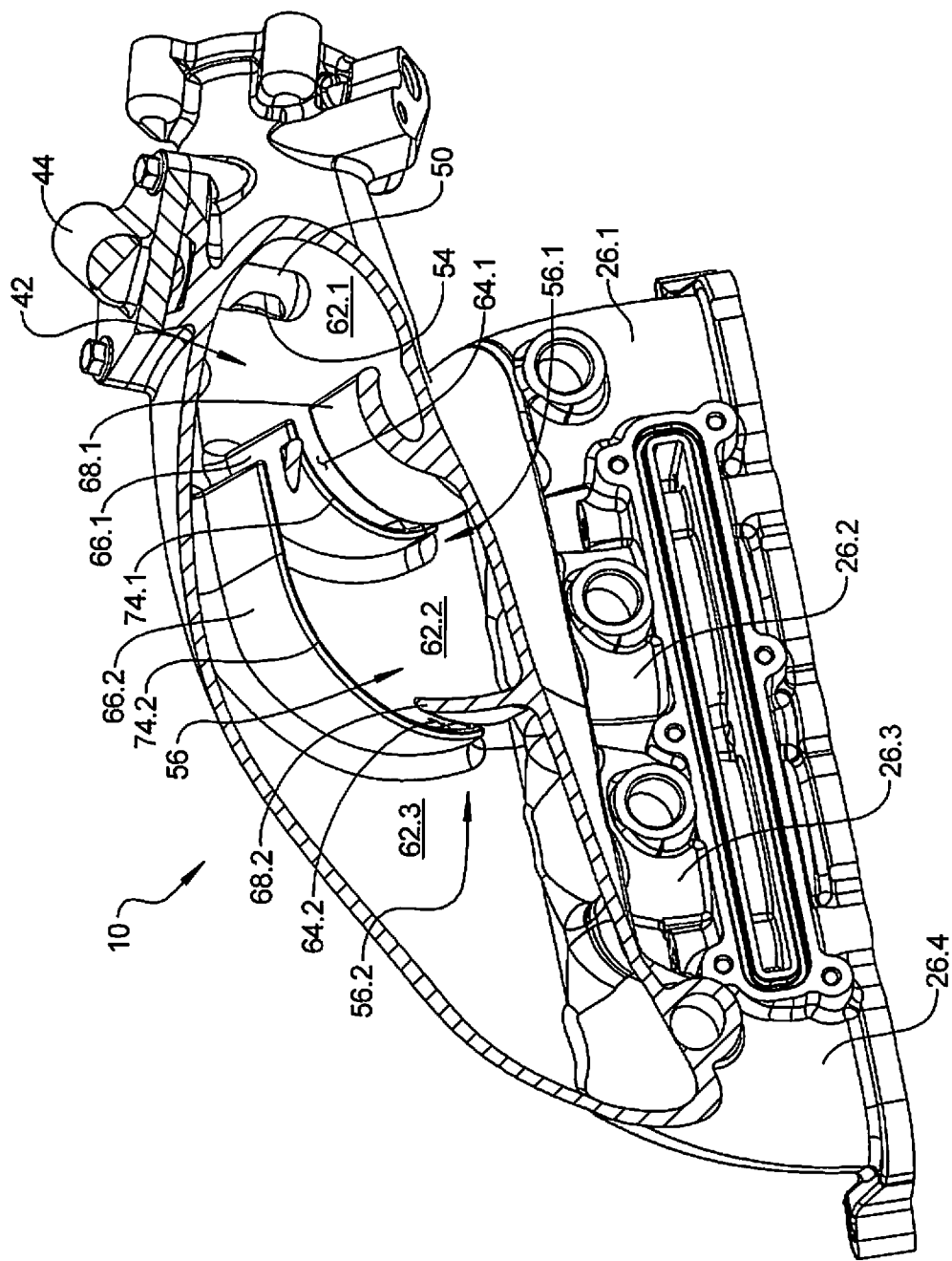
FIG. 2 is an elevational view of an intake manifold with a partial cutaway view showing a cross-section through the plenum region thereof.
Figure 3:
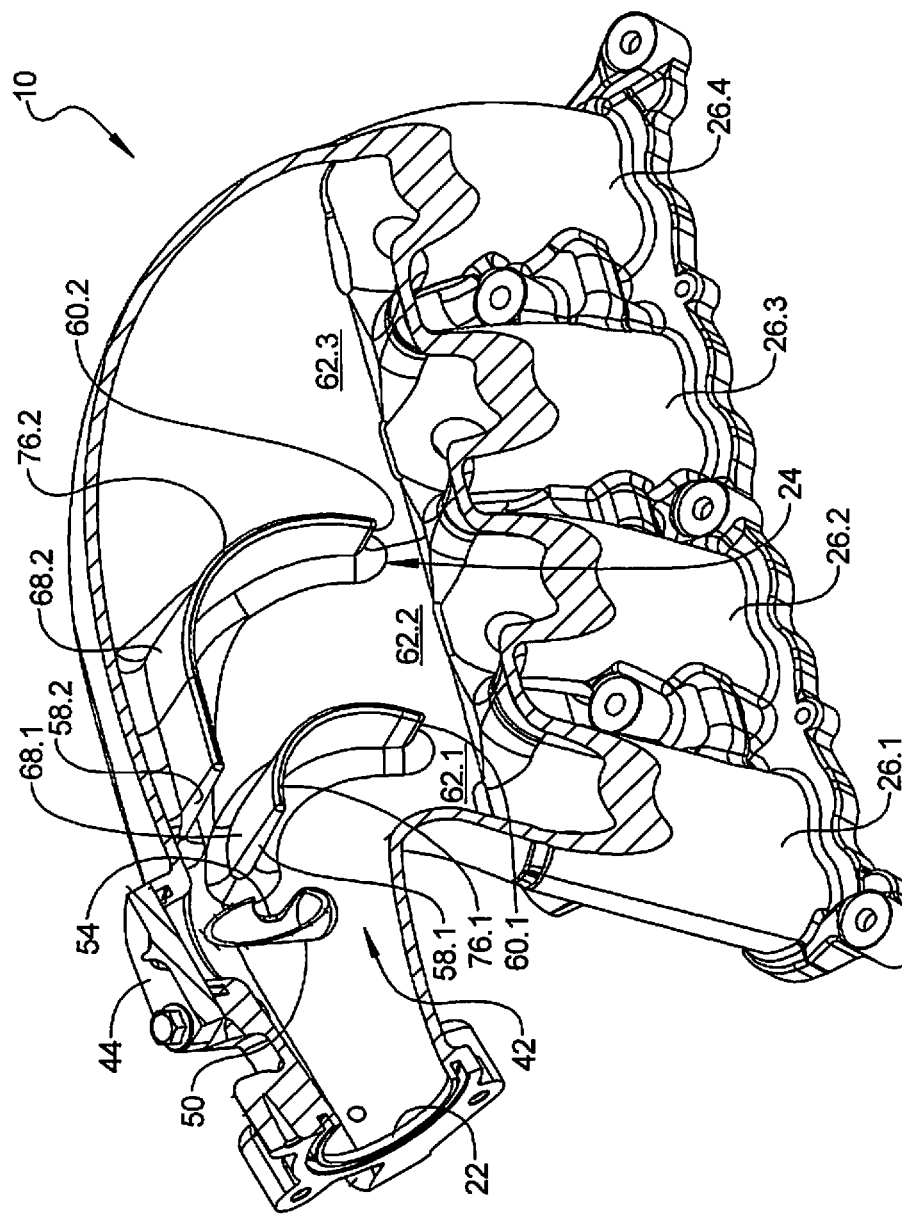
FIG. 3 is a perspective view of the intake manifold shown in FIG. 2 with a partial cutaway illustrating the tube and guide vanes.
Figure 4:
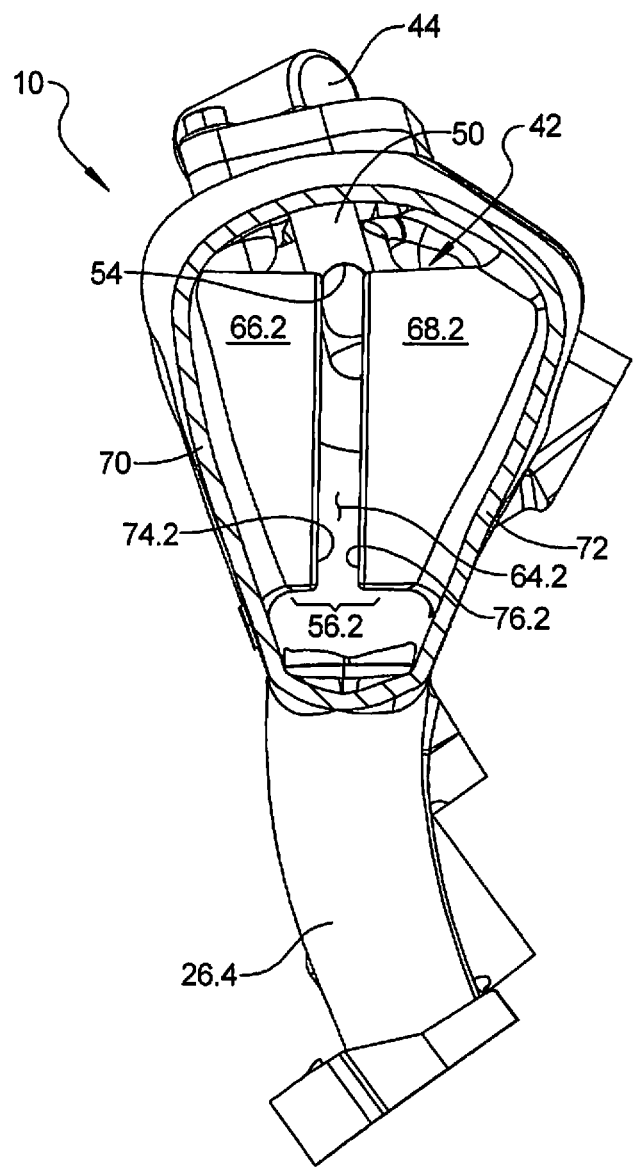
FIG. 4 is an end view of the intake manifold shown in FIG. 2 with a partial cutaway showing the tube and guide vanes.

With reference now to FIGS. 2-4, the intake manifold 10 includes an EGR-air flow distributor 42 for distributing the desired air flow and EGR-air mixture through the intake manifold 10 to each cylinder 14. The EGR-air flow distributor 42 includes an inlet cover 44 disposed over an EGR inlet 46 formed in the intake manifold 10. The inlet cover 44 has a passageway 48 providing fluid communication between the return line 38 and an EGR tube 50. The EGR tube 50 is disposed in the inlet manifold 10 and partially extends into a plenum region 24 of the inlet manifold 10. The EGR tube 50 has a slot 54 formed therein which faces away from the air inlet 22 of the inlet manifold 10 and toward the plenum region 24. The slotted EGR tube 50 functions to introduce EGR into the inlet manifold 10 at a single point downstream of the throttle valve 28 (not shown in FIGS. 2-4). The EGR-air flow distributor 42 also includes a set of one or more guide vanes 56 for directing EGR and air through the intake manifold 10 and to the inlet ports 18. As illustrated in FIGS. 2-4, this set of guide vanes 56 includes a first curved guide vane 56.1 and a second curved guide vane 56.2.

The first guide vane 56.1 is arranged in the plenum region 24 and has an upstream end 58.1 positioned near the EGR tube 50. The first guide vane 56.1 diverges from the EGR tube 50 to a downstream end 60.1 which terminates near the intersection of inlet runner 26.1 and inlet runner 26.2 to form first and second flow channels 62.1, 62.2 in the plenum region 24. The set of guide vanes 56 includes a second curved guide vane 56.2 arranged in the plenum region 24 and has an upstream end 58.2 positioned near the upstream end 58.1 of the first guide vane 56.1. The second guide vane 56.2 diverges from the first guide vane 56.1, divides the second flow channel 62.2 to form a third flow channel 62.3 in the plenum region 24, and terminates at a downstream end 60.2 near the intersection of inlet runner 26.2 and inlet runner 26.3.

Each of the vane guides 56.1, 56.2 have a vane gap 64.1, 64.2 formed therein allowing for fluid communication across and between adjacent flow channels 62.1, 62.2 and 62.2, 62.3. The vane gap also facilitates admitting exhaust gases and combustion gases. In one embodiment, the vane guides 56.1, 56.2 include a first wall portion 66.1, 66.2 extending from a side wall 70 of the intake manifold 10 and a second wall portion 68.1, 68.2 extending from an opposite side wall 72 of the intake manifold 10. The first wall portions 66.1, 66.2 having a free end 74.1, 74.2 terminating near a free end 76.1, 76.2 of the second wall portion 68.1, 68.2 to define the vane gap 64.1, 64.2. The vane gaps 64.1, 64.2 may be formed in the guide vanes 56.1, 56.2 so as to generally align with the slot 54 formed in the EGR tube 50 as best seen in FIG. 4.

The geometry of the EGR-air flow distributor 42 as illustrated and described herein includes a pair of curved guide vanes 56.1, 56.2 which divide the plenum into three flow channels 62.1, 62.2, 62.3 and terminate near the intersection of inlet runners 26.1, 26.2 and inlet runners 26.2, 26.3. One of ordinary skill in the art will recognize that modifications and/or variations to this geometry (e.g., number of guide vanes and flow channels, location of upstream and downstream ends, size and location of vane gaps, [INSERT OTHER VARIATIONS]) may be developed to achieve and maintain the desired air flow cylinder distribution. Similarly, the location of the EGR tube 50 relative to the guide vanes 56 and the size, geometry and location of the slot 54 formed in the EGR tube 50 may be modified and/or varied to achieve and maintain the desired air flow cylinder distribution.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An air intake system for an internal combustion engine comprising:
   an intake manifold having an air inlet for admitting combustion gases, including at least air, into a plenum, and at least two runners extending from the plenum, wherein each runner terminates at an outlet through which said combustion gases flow from the manifold;
   an EGR inlet for admitting exhaust gases recirculated by an EGR circuit from an exhaust side of the engine;
   an EGR tube disposed in the EGR inlet and partially extending into the plenum adjacent the air inlet, wherein the EGR tube has a slot formed therein which faces 180° away from the air inlet and into the plenum; and
   a guide vane arranged in the plenum and having an upstream end positioned near the EGR tube, wherein the guide vane diverges from the EGR tube between the at least two runners to form multiple flow channels in the plenum.

2. The air intake system of claim 1 wherein the guide vane has a vane gap formed therein allowing for fluid communication across and between the multiple flow channels.

3. The air intake system of claim 2 wherein the vane gap formed in the guide vane aligns with the slot formed in the EGR tube.

4. The air intake system of claim 2 wherein the guide vane comprises a first wall portion extending from a first side of the intake manifold and a second wall portion extending from a second side of the intake manifold, said first wall portion having a free end terminating near a free end of said second wall portion to define the vane gap therebetween.

5. The air intake system of claim 1 further comprising an inlet cover disposed over the EGR inlet and in fluid communication with the EGR tube.

6. An air intake system for an internal combustion engine comprising:
   an intake manifold having an air inlet for admitting combustion gases, including at least air, into a plenum and four runners extending from the plenum, wherein each runner terminates at an outlet through which said combustion gases flow from the manifold;
   an EGR inlet for admitting exhaust gases recirculated by an EGR circuit from an exhaust side of the engine;
   an EGR tube disposed in the EGR inlet and partially extending into the plenum adjacent the air inlet, wherein the EGR tube has a slot formed therein which faces 180° away from the air inlet and into the plenum;
   a first guide vane arranged in the plenum and having an upstream end positioned near the EGR tube, wherein the first guide vane diverges from the EGR tube to form first and second flow channels in the plenum; and
   a second guide vane arranged in the plenum and having an upstream end positioned near the upstream end of the first guide vane, wherein the second guide vane divides the second flow channel and diverges from the first guide vane to form a third flow channel in the plenum.

7. The air intake system of claim 6 wherein a downstream end of the first guide vane terminates near the intersection of a first runner and a second runner.

8. The air intake system of claim 7 wherein a downstream end of the second guide vane terminates near the intersection of the second runner and a third runner.

9. The air intake system of claim 6 wherein at least one of the first and second guide vanes has a vane gap formed therein allowing for fluid communication across and between adjacent flow channels.

10. The air intake system of claim 9 wherein the vane gap formed in the guide vane aligns with the slot formed in the EGR tube.

11. The air intake system of claim 9 wherein at least one of the first and second guide vanes comprises a first wall portion extending from a first side of the intake manifold and a second wall portion extending from a second side of the intake manifold, said first wall portion having a free end terminating near a free end of said second wall portion to define the vane gap therebetween.

12. The air intake system of claim 6 further comprising an inlet cover disposed over the EGR inlet and in fluid communication with the EGR tube.

13. An internal combustion engine comprising:
   an engine including an engine block having a plurality of cylinders and a cylinder head secured to the engine block to cover the cylinders, the cylinder head having an intake port and an exhaust port associated with each of the plurality of cylinders;
   an intake manifold secured to an intake side of the engine and in fluid communication with each of the intake ports, the intake manifold having an air inlet for admitting combustion gases, including at least air, into a plenum, and a plurality of runners extending from the plenum, wherein each runner terminates at the intake port associated with each of the cylinders;
   an exhaust manifold secured to an exhaust side of the engine, in fluid communication with each of the exhaust ports and having an exhaust outlet for discharging exhaust gas from the exhaust manifold;
   an exhaust gas recirculation (EGR) circuit including a return line from the exhaust side of the engine to an EGR inlet formed in the intake manifold, an EGR valve disposed in the return line for selectively controlling the timing and amount of exhaust gases being recirculated to the intake manifold, an EGR tube disposed in the EGR inlet and partially extending into the plenum adjacent the air inlet, wherein the EGR tube has a slot formed therein which faces 180° away from the air inlet and into the plenum, a first guide vane arranged in the plenum and having an upstream end positioned near the EGR tube, wherein the first guide vane diverges from the EGR tube between the plurality of runners to form first and second flow channels in the plenum.

14. The internal combustion engine of claim 13 further comprising a second guide vane arranged in the plenum and having an upstream end positioned near the upstream end of the first guide vane, wherein the second guide vane divides the second flow channel and diverges from the first guide vane to form a third flow channel in the plenum.

15. The internal combustion engine of claim 13 wherein the guide vane has a vane gap formed therein allowing for fluid communication across and between the first and second flow channels.

16. The air intake system of claim 15 wherein the vane gap formed in the guide vane aligns with the slot formed in the EGR tube.

17. The air intake system of claim 16 wherein the guide vanes comprise a first wall portion extending from a first side of the intake manifold and a second wall portion extending from a second side of the intake manifold, said first wall portion having a free end terminating near a free end of said second wall portion to define the vane gaps therebetween.

18. The air intake system of claim 13 further comprising an inlet cover disposed over the EGR inlet and in fluid communication with the EGR tube.

\* \* \* \* \*